May 4, 1926.  1,583,226

J. FLYNN

VULCANIZER

Filed Oct. 30, 1925    2 Sheets-Sheet 2

John Flynn
Inventor by Smith and Freeman
Attorneys

Patented May 4, 1926.

1,583,226

UNITED STATES PATENT OFFICE.

JOHN FLYNN, OF AKRON, OHIO, ASSIGNOR TO THE WILLIAMS FOUNDRY AND MACHINE COMPANY, OF AKRON, OHIO, A CORPORATION OF OHIO.

VULCANIZER.

Application filed October 30, 1925. Serial No. 65,776.

*To all whom it may concern:*

Be it known that I, JOHN FLYNN, a citizen of the United States of America, and a resident of Akron, in the county of Summit and State of Ohio, have invented certain new and useful Improvements in Vulcanizers, of which the following is a full, clear, and exact description.

My invention relates to watch case vulcanizers and the principal object of my invention is to provide a new and improved vulcanizer of this type. In the drawings accompanying this specification and forming a part thereof I have shown, for purposes of illustration, one form which my invention may assume. In these drawings:

Figure 2 is a section on the line 2—2 of Figure 1, while

Figure 1:
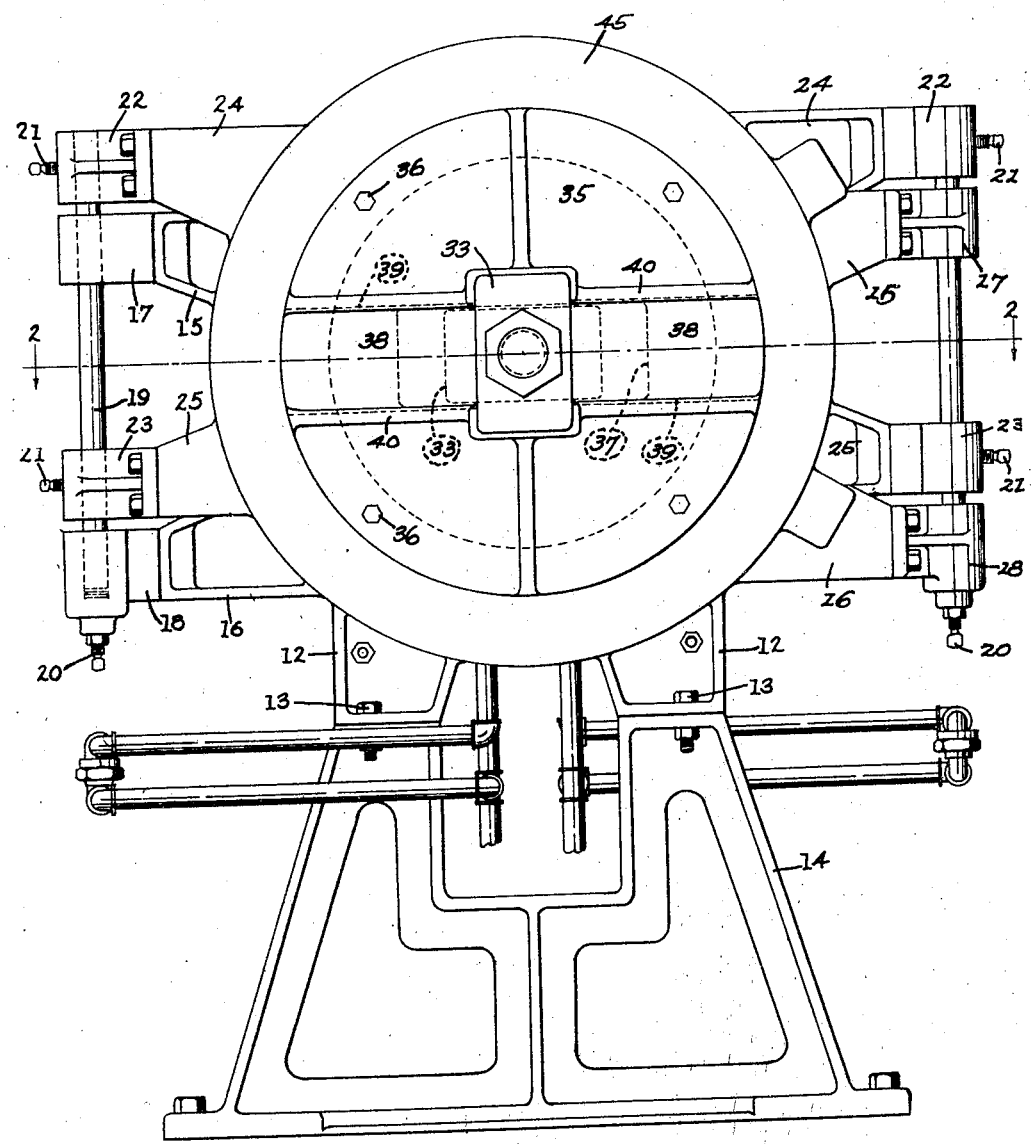
Figure 1 is front elevation of this illustrative embodiment of my invention.
Figure 2:
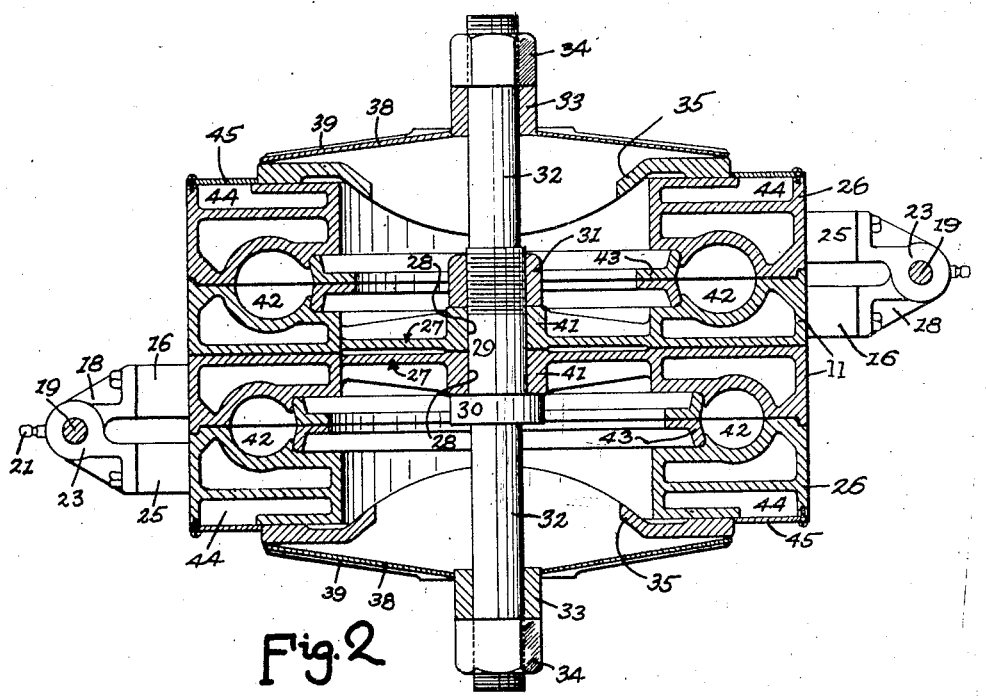
Figure 3:
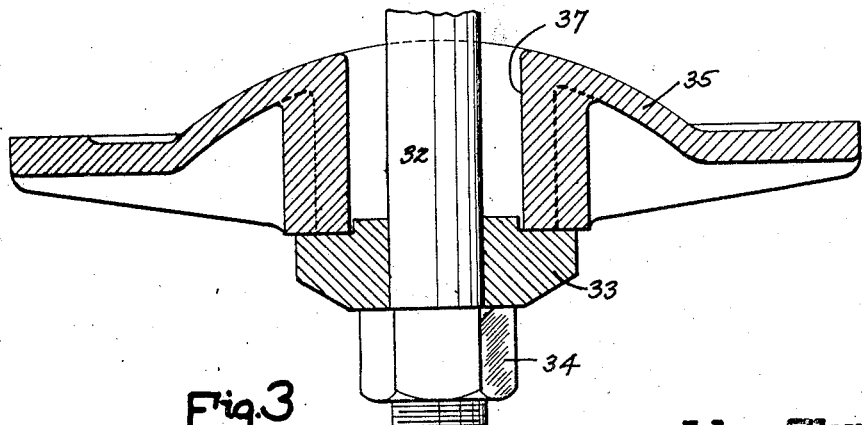
Figure 3 is a fragmentary section on the line 3—3 of Figure 1.

The vulcanizer herein shown comprises a pair of stationary mold sections 11 each provided with a pair of legs 12 arranged to be secured by means of bolts 13 to a common supporting pedestal 14, and with laterally extending upper and lower brackets 15 and 16 carrying upper and lower bearings 17 and 18 in which is rotatably mounted a shaft 19 supported vertically by means of the adjustable abutment 20 carried by the lower end of the bearing 18 and itself supporting by means of set screws 21 upper and lower arms 22 and 23 which in turn support upper and lower brackets 24 and 25 extending from and a part of a movable mold section 26 formed to cooperate with the corresponding stationary mold section 11 to form the cavity 42 and to support any desired additional part, such as the bull-ring 43 used in curing pneumatic tires.

Closing the adjacent faces of the two stationary mold sections 11 are a pair of webs 27 provided centrally with alined bosses 41 pierced by alined apertures 28 through which extends a stud 29 supported in position in the bosses 41 by means of a head 30 and a nut 31 engaging the outer faces of the two bosses 41, acting in this manner to secure together the two webs 27 and thus additionally secure together the two stationary mold sections 11, and provided beyond the head 30 and nut 31 with two projections 32 each carrying a rectangular plate 33 arranged to be actuated longitudinally of the extension 32 by means of a nut 34 also carried by the extension 32 beyond the plate 33, arranged in one position to engage a spider 35 loosely secured by means of bolts 36 to the corresponding movable section 26, closing the central opening in the outer face of the corresponding movable mold section 26, effective to transmit to the movable mold section 26 the thrust imparted to the plate 33 by the nut 34 to force the corresponding movable mold section 26 into close proximity with the cooperating stationary mold section 11, and provided with an aperture 37 which is closable by means of covers 38 mounted in channels 39 in the ribs 40 of the spider 35, and is formed to permit passage of the plate 33 when the slides 38 are withdrawn and the plate 33 is in the position indicated in dotted lines in Figure 1.

The outer faces of each movable mold section 26 may be provided with suitable pockets 44 for the reception of heat insulating material intended to decrease radiation from the mold, and these pockets 44 may be closed by suitable covers 45. In addition, the entire exterior periphery of the mold may be covered with similar heat insulating material to thus decrease such radiation from that surface.

In operation, the article to be cured is placed within the cavity of one of the stationary mold sections 11, the corresponding movable mold section 26 is swung into position, the plate 33 is rotated into the position shown in full lines in Figure 1 and in which it will engage the spider 35, and the nut 34 is actuated to act through the plate 33 and spider 35 to move the movable mold section 26 into position tightly against the cooperating stationary mold section 11, the necessary adjustment between the spider 35 and the movable mold section 26 occurring by slippage of the spider 35 on the mold section 26 permitted by the loose engagement of the spider supporting bolts 36, and also by slippage of the plate 33 on the spider 35 and nut 34, and the spider 35 serving to seal the central opening in the outer face of the movable mold section 26 and also, because of the presence of the webs 27, to close the space within that mold regardless of the condition or position of the movable mold member 26 cooperating with the other stationary mold member 11. On opening, the nut 34 is backed off a sufficient amount to permit rotation of the plate 33 into the dotted position after which the movable mold section 26 may be swung open without further actuation of the nut 34.

From the above description it will be obvious to those skilled in the art that the embodiment of my invention herein disclosed provides a watch case heater accomplishing the objects of my invention and superior particularly in the method of clamping the movable section in position on the corresponding stationary mold section, the method of additionally securing the stationary mold sections together, and the method of segregating the space within the mold to prevent radiation of heat from the inner periphery of the mold.

It will also be apparent to those skilled in the art that the embodiment of my invention herein disclosed embodies advantages other than those specifically pointed out or suggested herein, and also that this particular embodiment of my invention may be variously changed and modified without departing from the spirit of my invention or sacrificing the advantages thereof. It will therefore be understood that this disclosure is illustrative only and that my invention is not limited thereto.

I claim:

1. A watch case vulcanizer comprising a movable annular mold section; a cooperating mold section; and securing means for holding said movable section in position upon said cooperating section comprising a stud arranged to extend through the center opening of said movable section when said movable section is in such position, spider means arranged to bear against said movable section to force said movable section toward said cooperating section, and connecting means cooperating with said stud and arranged to engage said spider means to act through said spider means to force said movable section toward said cooperating section.

2. A watch case vulcanizer comprising a movable annular mold section; a cooperating mold section; and securing means for holding said movable section in position upon said cooperating section comprising a stud carried by said cooperating section and arranged to extend through the center opening of said movable section when said movable section is in such position, spider means arranged to bear against said movable section to force said movable section toward said cooperating section, and connecting means cooperating with said stud and arranged to engage said spider means to act through said spider means to force said movable section toward said cooperating section.

3. A watch case vulcanizer comprising a movable annular mold section; a cooperating mold section; and securing means for holding said movable section in position upon said cooperating section comprising a solid web closing the central opening in the face of said cooperating section remote from said movable section, a stud supported by said web and arranged to extend through the center opening of said movable section when said movable section is in such position, spider means arranged to bear against said movable section to force said movable section toward said cooperating section, and connecting means cooperating with said stud and arranged to engage said spider means to act through said spider means to force said movable section toward said cooperating section.

4. A watch case vulcanizer comprising a movable annular mold section; a cooperating mold section; and securing means for holding said movable section in position upon said cooperating section comprising a stud arranged to extend through the center opening of said movable section when said movable section is in such position, spider means arranged to bear against said movable section to force said movable section toward said cooperating section and to close the central opening in the outer face of said movable section, and connecting means cooperating with said stud and arranged to engage said spider means to act through said spider means to force said movable section toward said cooperating section.

5. A watch case vulcanizer comprising a movable annular mold section; a cooperating mold section; and securing means for holding said movable section in position upon said cooperating section comprising a solid web closing the central opening in the face of said cooperating section remote from said movable section, a stud supported by said web and arranged to extend through the center opening of said movable section when said movable section is in such position, spider means arranged to bear against said movable section to force said movable section toward said cooperating section and to close the central opening in the outer face of said movable section, and connecting means cooperating with said stud and arranged to engage said spider means to act through said spider means to force said movable section toward said cooperating section.

6. A watch case vulcanizer comprising a movable annular mold section; a cooperating mold section; and securing means for holding said movable section in position upon said cooperating section comprising a stud arranged to extend through the center opening of said movable section when said movable section is in such position, spider means supported by said movable section and arranged to bear against said movable section to force said movable section toward said cooperating section, and connecting means cooperating with said stud and arranged to engage said spider means to act through said spider means to force said movable section toward said cooperating section.

7. A watch case vulcanizer comprising a movable annular mold section; a cooperating mold section; and securing means for holding said movable section in position upon said cooperating section comprising a stud supported by said cooperating section and arranged to extend through the center opening of said movable section when said movable section is in such position, spider means supported by said movable section and arranged to bear against said movable section to force said movable section toward said cooperaing section, and connecting means cooperating with said stud and arranged to engage said spider means to act through said spider means to force said movable section toward said cooperating section.

8. A watch case vulcanizer comprising a movable annular mold section; a cooperating mold section; and securing means for holding said movable section in position upon said cooperating section comprising a stud arranged to extend through the center opening of said movable section when said movable section is in such position, spider means supported by said movable section and arranged to bear against said movable section to force said movable section toward said cooperating section and to close the central opening in the outer face of said movable section, and connecting means cooperating with said stud and arranged to engage said spider means to act through said spider means to force said movable section toward said cooperating section.

9. A watch case vulcanizer comprising a movable annular mold section; a cooperating mold section; and securing means for holding said movable section in position upon said cooperating section comprising a stud arranged to extend through the center opening of said movable section when said movable section is in such position, spider means arranged to bear against said movable section to force said movable section toward said cooperating section, and quick detachable connecting means cooperating with said stud and arranged to engage said spider means to act through said spider means to force said movable section toward said cooperating section.

10. A watch case vulcanizer comprising a movable annular mold section; a cooperating mold section; and securing means for holding said movable section in position upon said cooperating section comprising a stud arranged to extend through the center opening of said movable section when said movable section is in such position, spider means arranged to bear against said movable section to force said movable section toward said cooperating section and provided with a central aperture, a plate arranged in one position to engage said spider means and in the other position to pass through said aperture, and connecting means cooperating with said stud and arranged to engage said plate to act through said plate and said spider means to force said movable section toward said cooperating section.

11. A watch case vulcanizer comprising a movable annular mold section; a cooperating mold section; and securing means for holding said movable section in position upon said cooperating section comprising a stud arranged to extend through the center opening of said movable section when said movable section is in such position, spider means carried by said movable section and arranged to bear against said movable section to force said movable section toward said cooperating section and provided with a central aperture, a plate arranged in one position to engage said spider means and in another to pass through said aperture, and connecting means cooperating with said stud and arranged to engage said plate to act through said plate and said spider means to force said movable section toward said cooperating section.

12. A double watch case vulcanizer comprising two stationary mold sections arranged back to back; two annular movable mold sections one cooperating with each of said stationary sections; a stud secured to both of said stationary sections, securing said stationary sections together, and having its two ends disposed to project one through the central opening of each of said movable sections when that movable section is against the corresponding stationary section; and two securing means each for securing one of said movable sections in such position and each comprising means cooperating with the corresponding stud-end to hold that movable section in such position.

13. A double watch case vulcanizer comprising two annular stationary mold sections arranged back to back and each provided with a solid web closing the central opening in that face adjacent the other stationary section; two annular movable mold sections one cooperating with each of said stationary sections; a stud secured to both of said webs, securing said stationary sections together through said webs, and having its two ends disposed to project one through the central opening of each of said movable sections when that movable section is against the corresponding stationary section; and two securing means each for securing one of said movable sections in such position and each comprising means cooperating with the corresponding stud end to hold that movable section in such position.

14. A double watch case vulcanizer comprising two annular stationary mold sections arranged back to back and each provided with a solid web closing the central opening in that face adjacent the other stationary section; two annular movable mold sections one cooperating with each of said stationary sections; a stud secured to both of said webs, securing said stationary sections together through said webs, and having its two ends disposed to project one through the central opening of each of said movable sections when that movable section is against the corresponding stationary section; and two securing means each for securing one of said movable sections in such position and each comprising means cooperating with the corresponding stud end to hold that movable section in such position and to close the central opening in the outer face of that movable section.

15. A double watch case vulcanizer comprising two stationary mold sections arranged back to back; two annular movable mold sections one cooperating with each of said stationary sections; a stud secured to both of said stationary sections, securing said stationary sections together, and having its two ends disposed to project one through the central opening of each of said movable sections when that movable section is against the corresponding stationary section; and two securing means each for securing one of said movable sections in such position and each comprising quick detachable means cooperating with the corresponding stud end to hold that movable section in such position.

16. A double watch case vulcanizer comprising two stationary mold sections arranged back to back; two annular movable mold sections one cooperating with each of said stationary sections; a stud secured to both of said stationary sections, securing said stationary sections together, and having its two ends disposed to project one through the central opening of each of said movable sections when that movable section is against the corresponding stationary section; and two securing means each for securing one of said movable sections in such position and each comprising spider means arranged to bear against that movable section to force that movable section toward the corresponding stationary section, and connecting means cooperating with the corresponding stud end and arranged to engage the corresponding spider means to act through that spider means to force that movable section toward the corresponding stationary section.

17. A double watch case vulcanizer comprising two stationary mold sections arranged back to back; two annular movable mold sections one cooperating with each of said stationary sections; a stud secured to both of said stationary sections, securing said stationary sections together, and having its two ends disposed to project one through the central opening of each of said movable sections when that movable section is against the corresponding stationary section; and two securing means each for securing one of said movable sections in such position and each comprising spider means arranged to bear against that movable section to force that movable section toward the corresponding stationary section and to close the central opening in the outer face of that movable section, and connecting means cooperating with the corresponding stud end and arranged to engage the corresponding spider means to act through that spider means to force that movable section toward the corresponding stationary section.

18. A double watch case vulcanizer comprising two annular stationary mold sections arranged back to back and each provided with a solid web closing the central opening in that face adjacent the other stationary section; two annular movable mold sections one cooperating with each of said stationary sections; a stud secured to both of said webs, securing said stationary sections together through said webs, and having its two ends disposed to project one through the central opening of each of said movable sections when that movable section is against the corresponding stationary section; and two securing means each for securing one of said movable sections in such position and each comprising spider means arranged to bear against that movable section to force that movable section toward the corresponding stationary section and to close the central opening in the outer face of that movable section, and connecting means cooperating with the corresponding stud end and arranged to engage the corresponding spider means to act through that spider means to force that movable section toward the corresponding stationary section.

19. A double watch case vulcanizer comprising two stationary mold sections arranged back to back; two annular movable mold sections one cooperating with each of said stationary sections; a stud secured to both of said stationary sections, securing said stationary sections together, and having its two ends disposed to project one through the central opening of each of said movable sections when that movable section is against the corresponding stationary section; and two securing means each for securing one of said movable sections in such position and each comprising spider means carried by the corresponding movable section and arranged to bear against that movable section to force that movable section toward the corresponding stationary section, and connecting means cooperating with the corresponding stud end and arranged to engage the corresponding spider means to act through that spider means to force that movable section toward the corresponding stationary section.

In testimony whereof I hereunto affix my signature.

JOHN FLYNN.